(12) United States Patent
Schliwa et al.

(10) Patent No.: US 10,899,452 B2
(45) Date of Patent: Jan. 26, 2021

(54) TOILET MODULE FOR A VEHICLE AND A VEHICLE INCLUDING A TOILET MODULE

(71) Applicant: AIRBUS OPERATIONS GMBH, Hamburg (DE)

(72) Inventors: Ralf Schliwa, Hamburg (DE); Volker Luderer, Hamburg (DE); Florian Schuephaus, Hamburg (DE); Roland Lange, Nottensdorf (DE); Michael Eckert, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 15/857,309

(22) Filed: Dec. 28, 2017

(65) Prior Publication Data

US 2018/0118348 A1    May 3, 2018

Related U.S. Application Data

(63) Continuation of application No. 14/466,465, filed on Aug. 22, 2014, now Pat. No. 9,862,490, which is a
(Continued)

(30) Foreign Application Priority Data

Feb. 24, 2012    (DE) ................. 10 2012 003 713

(51) Int. Cl.
   *B64D 11/02*    (2006.01)
   *B64D 11/00*    (2006.01)

(52) U.S. Cl.
   CPC ...... *B64D 11/02* (2013.01); *B64D 2011/0046* (2013.01); *B64D 2011/0092* (2013.01)

(58) Field of Classification Search
   CPC ....................................................... B64D 11/02
   (Continued)

(56) References Cited

U.S. PATENT DOCUMENTS 4,884,767 A  *  12/1989  Shibata ................. B64D 11/02
                                                         244/118.5
5,474,260 A     12/1995  Schwertfeger et al.
(Continued)

FOREIGN PATENT DOCUMENTS

DE     202005015729 U1    1/2006
DE     102012003713 A1    8/2013
(Continued)

OTHER PUBLICATIONS

U.S. Appl. No. 61/602,692, filed Feb. 24, 2012.
(Continued)

*Primary Examiner* — Janie M Loeppke
(74) *Attorney, Agent, or Firm* — Lerner, David, Littenberg, Krumholz & Mentlik, LLP

(57) ABSTRACT

A toilet module and a vehicle including a toilet module are provided. An exemplary toilet module includes a toilet unit and a housing. The housing includes a front wall with an access opening, a first functional wall arranged opposite the front wall and supporting the toilet unit, and a second functional wall perpendicular to the front wall and extending between the front wall and the first functional wall. Further, the toilet module includes a storage shelf attached to the housing and a swivable table attached to the housing and movable to an extended configuration. The swivable table overlaps the storage shelf when in the extended configuration.

19 Claims, 14 Drawing Sheets

Related U.S. Application Data continuation of application No. PCT/EP2012/069289, filed on Sep. 28, 2012.

(60) Provisional application No. 61/602,692, filed on Feb. 24, 2012.

(58) Field of Classification Search
USPC .......................................................... D23/271
See application file for complete search history.

(56) References Cited

U.S. PATENT DOCUMENTS

| | | | |
|---|---|---|---|
| 5,560,050 A * | 10/1996 | Tagg | A47K 11/02 4/449 |
| 6,079,669 A | 6/2000 | Hanay et al. | |
| 6,273,366 B1 | 8/2001 | Sprenger et al. | |
| 7,284,287 B2 | 10/2007 | Cooper et al. | |
| 7,364,119 B2 * | 4/2008 | Sprenger | B64D 11/00 244/118.6 |
| D593,646 S * | 6/2009 | Bock | D23/271 |
| D593,647 S * | 6/2009 | Bock | D23/271 |
| 7,866,603 B2 | 1/2011 | Cooper et al. | |
| 8,590,838 B2 | 11/2013 | Cook et al. | |
| 8,662,444 B2 | 3/2014 | Tappe et al. | |
| 9,826,307 B2 | 11/2017 | Kubota et al. | |
| 2006/0150316 A1 * | 7/2006 | Fukuizumi | A47K 5/1217 4/623 |

FOREIGN PATENT DOCUMENTS

| | | |
|---|---|---|
| EP | 0867365 A2 | 9/1998 |
| EP | 1209078 A2 | 5/2002 |
| JP | 2008239036 A | 10/2008 |
| RU | 35999 U1 | 2/2004 |

OTHER PUBLICATIONS

International Searching Authority, International Search Report for International Application PCT/EP2012/069289, dated Dec. 11, 2012.
State Intellectual Property Office of the Peoples' Republic of China, Office Action for Chinese Patent Application No. 201280070484.6 dated Jul. 15, 2015.
Federal Service for Intellectual Property, Office Action in Russian Patent Application No. 2014134142/11(055159) dated Jul. 14, 2016.

* cited by examiner

TOILET MODULE FOR A VEHICLE AND A VEHICLE INCLUDING A TOILET MODULE

CROSS-REFERENCE TO RELATED APPLICATIONS

This is a continuation of International Application No. PCT/EP2012/069289, filed Sep. 28, 2012, which application claims priority to German Patent Application No. 10 2012 003 713.9, filed Feb. 24, 2012, to U.S. Provisional Patent Application No. 61/602,692, filed Feb. 24, 2012, and to U.S. application Ser. No. 14/466,465, filed Aug. 22, 2014, which are each incorporated herein by reference in their entirety.

TECHNICAL FIELD

The technical field relates to a toilet module for a vehicle and to a vehicle including a vehicle cabin and a toilet module.

BACKGROUND

An important goal when setting up passenger cabins in means of transport is often to maximise the available number of seats for passengers, which is limited among other things by the number of prescribed seats for flight attendants and by prescribed safety means, supply means and toilets. The ratio of the number of passenger seats to other means in the passenger cabin is a factor which influences the economic viability of an aircraft in line operation. As well as official regulations for the prototype certification and operational certification of means of transport, customer wishes should also be taken into account when selecting seat sizes, seat spacings, supply means and toilets, for example customer-specific special installations by operators of the means of transport.

It is generally virtually impossible to alter the sizes of aircraft kitchens because of the food which is to be carried and because of the required warming means capacity. However, DE 10 2009 034 406 A1 discloses an expandable toilet module of which the external dimensions can be enlarged during flight. Nevertheless, this can only be provided in a door region into which the toilet module can be enlarged.

DE 43 00 877 A1 and U.S. Pat. No. 5,474,260 A disclose an aircraft comprising a series of supply means and toilets.

In addition, other objects, desirable features and characteristics will become apparent from the subsequent summary and detailed description, and the appended claims, taken in conjunction with the accompanying drawings and this background.

SUMMARY

In an exemplary embodiment, a toilet module for a vehicle is provided and includes a toilet unit and a housing. The housing includes a front wall with an access opening, a first functional wall arranged opposite the front wall and supporting the toilet unit, and a second functional wall perpendicular to the front wall and extending between the front wall and the first functional wall. Further, the toilet module includes a storage shelf attached to the housing and a swivable table attached to the housing and movable to an extended configuration. The swivable table overlaps the storage shelf when in the extended configuration.

In another embodiment, a vehicle is provided and includes a vehicle cabin and a toilet module. The toilet module includes a housing and a toilet unit, wherein the toilet unit has a longitudinal extension axis. The housing includes a first functional wall arranged opposite the front wall and supporting the toilet unit, a second functional wall extending between the first functional wall and the front wall, wherein the second functional wall is perpendicular to the front wall, a front wall with an access opening, wherein the housing encloses a floor surface on the underside of the housing; and wherein the toilet unit has a longitudinal extension axis which forms an angle with the second functional wall. The toilet module further includes a horizontally arranged storage shelf inside the toilet module adjacent to the second functional wall, and a swivable table attached to the housing and movable to an extended configuration, wherein the swivable table overlaps the horizontally arranged storage shelf when in the extended configuration.

In yet another embodiment, a toilet module for a vehicle includes a toilet unit and a housing. The housing includes a front wall with an access opening, a first functional wall arranged opposite the front wall and supporting the toilet unit; a second functional wall perpendicular to the front wall and extending between the front wall and the first functional wall, and a third functional wall parallel to the second functional wall and perpendicular to the front wall and extending between the front wall and the first functional wall. The toilet module further includes a storage shelf attached to the housing, and a swivable table extending from the second functional wall to the third functional wall and movable to an extended configuration, wherein the swivable table is supported by the storage shelf when in the extended configuration.

Various teachings of the present disclosure provide a toilet module which is as compact as possible for integration into a vehicle cabin and which basically has the smallest possible width, while having an overall depth which is unchanged in so far as possible by comparison with conventional toilet modules, so as to optimise the space provided in the vehicle cabin.

A toilet module for a vehicle comprises a front wall, a first functional wall and at least one second functional wall, the first functional wall being arranged opposite the front wall and supporting a toilet unit, the at least one second functional wall extending between the first functional wall and the front wall and perpendicular to the front wall, the toilet unit having a longitudinal extension axis which forms an angle which is greater than 0° with the at least one second functional wall.

The names of the individual walls of the housing of the toilet module according to the various teachings of the present disclosure are selected in accordance with their purpose. While a front wall acts as a visual barrier separating the toilet module from a passenger cabin and allows access through an opening, the first functional wall and the at least one second functional wall are primarily required for the supporting function thereof in particular, so as to achieve the object of the toilet module.

The toilet module is constructed in such a way that it can be accommodated between other modules or between rows of seats in a transverse or longitudinal direction of a vehicle cabin. In this context, the access opening in the front wall can be entered from an aisle within the vehicle, and so the front wall should be orientated either parallel to the aisle or, if the toilet module is in a tail region of the aircraft, perpendicular thereto.

A toilet unit may refer in one example, to a toilet bowl or a urinal on which a frame, a housing, an adapter or an attachment flange is arranged for fixing to a wall. The toilet unit is equipped with means which are required for the operation thereof, such as incoming water and waste water connections, locking sensors, control elements and optionally cover elements. In this context, the toilet unit can generally comprise a base which faces away from a use side and which can be fixed to the first functional wall.

The first functional wall is the wall which supports the toilet unit. The user of the toilet module according to the present disclosure enters the space enclosed by the housing through the access opening, and upon entering is facing directly towards the toilet unit on the opposite side. What is special about the toilet module is that the longitudinal extension axis of the toilet unit is not orientated perpendicular or parallel to one of the at least two functional walls, as is conventional in the prior art, but is oblique thereto at a particular angle. The user thus steps towards a toilet unit which is not orientated towards him in a straight line, but exhibits asymmetry. Thus, additional space can be created on one side of the toilet unit, making it easier to accommodate and use a washstand or other means. At the same time, this makes it possible to reduce the width of the toilet module, since the space required for a comfortable visit is available even with a reduced width. In this way, the toilet module according to the various teachings of the present disclosure can be made significantly narrower than conventional toilet units, thus making it possible to enlarge the available space within the vehicle cabin without having to forgo required means or comfort.

In one embodiment, a base of the toilet unit is arranged centrally on the first functional wall. The base is accordingly vertically centred on the first functional wall.

In one embodiment, the at least one second functional wall is substantially planar and has a plane of extension which extends from the floor surface to an upper face of the toilet module. In this embodiment, there are no protrusions or indentations.

In one embodiment, the angle between the longitudinal extension axis of the toilet unit and the second functional wall is in a range of from about 15° to about 45°. A significant increase in space within the toilet module can be achieved from an angle of approximately 15° onwards. Angles over about 45° have no significant influence on the available space, but can make the toilet unit less comfortable to use.

In one embodiment, the first functional wall is of a curved shape which corresponds at least in portions to a curved fuselage wall of a vehicle. This applies in particular to the fuselage of an aircraft, which is often of a cylindrical or elliptical shape or any desired mixed shapes. If the toilet module according to the present disclosure is integrated transversely between rows of passenger seats, alongside or in a modular arrangement, the first functional wall may be of a curved shape which makes it possible for the toilet module to extend from an aisle in the aircraft cabin until it is directly against the fuselage wall. The first functional wall is thus tight, at least in part, against the fuselage wall and makes optimum use of space possible. The arrangement of the toilet unit on this curved first functional wall makes it possible, with sufficient expansion in the longitudinal extension axis, to use the toilet unit while sitting without being constrained, there still being sufficient space for standing between the toilet unit and the front wall. If the toilet unit is used while sitting, the user's knees point away from the second functional wall, in such a way that a washbasin or the like which is arranged there does not get in the way.

It is to be understood that the first functional wall may also comprise a completely flat shape, even in curved portions of the fuselage, such as in a rear section comprising a pressure bulkhead. In the space between the first functional wall and the fuselage also functional components may be installed as well as stowage compartments or similar.

In one embodiment, the toilet module has an upper face, at least one second functional wall having on the upper face a portion to which a storage compartment is attached, which extends outwards from the housing of the toilet module. Valuable storage space can thus be provided outside the toilet module in a region of the vehicle cabin which would not be used by passengers sitting adjacent to the toilet module, while at the same time not taking up space within the toilet module. If the toilet module according to the present disclosure is located somewhat to the side of an aisle in a vehicle cabin, there are often storage compartments adjacent thereto, above the passenger seats. These are often only available in standardised dimensions, since they are to be fixed between structural components, such as fuselage formers, which are distributed equidistantly over the length of the vehicle fuselage and thus predetermine a particular transverse extent of the storage compartments. If the toilet module does not correspond exactly to the width of a storage compartment of this type having predetermined dimensions, or if it is not located directly on the relevant structural components which are used for fixing storage compartments, a region between the upper face of the toilet modules and the following storage compartment has to be bridged. This is often achieved with a blind, which has a purely visual function. The toilet module according to the present disclosure can make it possible to use this space in an expedient manner with the externally attached storage compartment. The storage compartment can be dimensioned in such a way that it can additionally be covered by a blind; on the other hand, the opening in the at least one second functional wall can also be dimensioned in such a way that the adjacent storage compartment can take on the function of a blind. In this storage compartment, it is possible for example to accommodate spare hand towels or other objects which are to be stored.

In one embodiment, the toilet module comprises two second functional walls, which are opposite one another and each comprise on the upper face thereof a portion on which a storage compartment extends towards the outside. The storage space can thus be maximised without having to enlarge the external dimensions of the toilet module.

In one embodiment, a washstand is arranged on one second functional wall of the at least one second functional walls in a region facing towards the front wall. In this way, the toilet module is fully equipped, the toilet unit and the washstand being as far away from one another as possible so as to make full use of the available space.

In one embodiment, the access opening is narrower than the actual front wall and is arranged in a region of the front wall remote from the washstand. The access opening thus does not take up the entire width of the front wall. As a result of the asymmetrical arrangement, a usable corner, into which the washstand extends, is located between the relevant second functional wall and the front wall. The front wall which is configured in this manner makes possible a considerable reduction in the space which is taken up.

In one embodiment, the washstand extends into a region of the front wall remote from the access opening. In this way, the washstand impinges on a region of the front wall which does not have any function relating to access to the toilet module. In this context, the washstand can also extend minimally into a region in front of the access opening, so long as this does not impede entry to the toilet module. In one example, the transition from the access opening to the widest point of the washstand can be formed in a visually pleasing manner by way of a curved shape, and the risk of collision can be eliminated.

In one embodiment, the washstand has a longitudinal extension, the longitudinal extension of the washstand extending substantially parallel to the longitudinal extension axis of the washstand. If the washstand comprises a washbasin of an approximately ellipsoidal shape, the available width may be greater than the necessary depth in the wash stand. In this example, the longitudinal extension could coincide with an axis which extends along the greatest extent of the washbasin or of the washstand which accommodates the washbasin. In addition, the washstand extends along the relevant second functional wall. For example, a front edge portion of the washstand which is arranged in the region of the washbasin and projects into the space, an extension axis of the washbasin, or another eye-catching feature may form the longitudinal extension of the washstand in this context. As a result of the parallel orientation of the two longitudinal extensions, a particularly expedient use of space and a particularly generous sense of space can be provided. In this way, a person standing at the washstand will be obstructed as little as possible by the toilet unit, and the intermediate space between the toilet unit and the washstand may be of a largely constant width.

In one embodiment, a vertical boundary wall of a storage space extends above the toilet unit as far as the first functional wall. Vertical in this context refers to an orientation perpendicular to the floor surface enclosed by the housing. If the first functional wall is curved, the toilet unit projects sufficiently far into the toilet module, as discussed previously, for a person to be able to sit on it and stand upright in front of it. Behind the toilet unit, as far as the first functional wall, this results in a region which can be used if a boundary wall is arranged in a vertical orientation. A storage space which is formed in this way is arranged in the toilet module in such a way that a user can use the toilet unit in a conventional manner without being impeded by the storage space. If the first functional wall is not curved, the toilet unit may, in one example, move or extend sufficiently far from the first functional wall into the toilet module that the vertical boundary wall can completely or mostly extend over it. When installed, the boundary surface is visually perceived to be the rear wall of the toilet module.

In one embodiment, the first functional wall is orientated parallel to the front wall. In this way, the toilet module according to the present disclosure may be of a rectangular cross-section, in such a way that the toilet module can be arranged to the side of an aisle in a vehicle cabin, for example in a tail portion or in a cylindrical region. Also, the overall design of the walls may thereby be clearly simplified.

In one embodiment, the first functional wall may also extend at an angle to the front wall, in such a way that the resulting toilet module could be arranged in a tail cone of an aircraft, in which the available depth becomes smaller, extending towards a pressure bulkhead which defines the tail end of the aircraft cabin. In this way, it would also further be conceivable to arrange the toilet unit in a deeper region of the toilet module, so as further to improve the sense of space.

If the use of toilet modules having non-perpendicular arrangements of the front wall and second functional wall is being considered, the toilet module should be modified in such a way that the front wall comprises an access opening which is remote from one of the at least one second functional walls, a washbasin being arranged in a region of the second functional wall which is orientated towards the front wall. The washstand should extend towards the front wall, while the toilet unit has an extension axis which faces away from the washstand.

In one embodiment, the second functional wall, towards which the toilet unit faces, has a protrusion on the underside thereof. The protrusion generally extends from the floor surface of the toilet module to a height which exceeds the height of the toilet unit, and which may be approximately at the height of a washstand which can be attached to one of the second functional walls. The protrusion may provide a larger space on the inside of the toilet module, and on the outside may make it possible for the backrests of passenger seats which are arranged directly adjacent to the toilet module to pivot inwards. The protrusion is in one example, located on the second functional wall towards which the toilet unit faces. The other second functional wall, which is opposite the second functional wall having the protrusion, may in a simple variant be made planar or substantially planar.

In one embodiment, the respective other second functional wall comprises an indentation, which is generally configured so as to correspond to the protrusion in the opposite second functional wall. Because a washstand or other means is usually positioned there, and does not take up excessive space on the underside thereof, the indentation can be provided without restricting the space as a result. In the meantime, this configuration makes it possible to line up a plurality of toilet modules according to the present disclosure, in which two second functional walls are positioned tight against one another, a protrusion projecting into an indentation in each case. A first toilet module may for example have a planar second functional wall and a second functional wall having a protrusion, while a subsequent second toilet module has an indentation on one second functional wall and a protrusion on the opposite second functional wall, in such a way that the second toilet wall can be positioned tight and flush against the first toilet module. Besides lining up the modules, however, the indentation can also be used so as to provide a passenger seat which is arranged behind with sufficient foot or leg room.

In an exemplary embodiment, a storage shelf is arranged inside the toilet module and is positioned adjacent to at least one of the at least one second functional wall. Thereby, the basin of a washstand may be integrated into this storage shelf such that a user may place items e.g. a toothbrush, toothpaste or other hygiene items onto this storage shelf. The storage shelf may be interpreted as a shelf like board that is horizontally arranged in the toilet module. Underneath a storage shelf a stowage compartment and/or a lining for a pleasant appearance may be arranged.

Compared to the above described element of the washstand, the storage shelf may comprise a clearly larger extension. Still, the storage shelf may primarily have the same function and may also be interpreted as a washstand. Therefore, all above-mentioned features directed to the washstand are also suitable for and may also relate to the storage shelf, independent of the basin being integrated into the storage shelf.

The storage shelf in one example, extends from a position adjacent to the first functional wall to a position adjacent to at least one of the at least one second functional wall. Thereby, a rather large storage space is provided for a user to temporarily place items on the storage shelf.

In one embodiment, the storage shelf may comprise a waste flap under which a rubbish bin is arranged. A wasty flap may be a flat, surface-like component that is swivably supported in a correspondingly shape opening of the storage shelf and comprises a spring mechanism that allows a swivelling motion of the waste flap in a downward direction into an open position. It further forces the waste flap to return into a closed position such that the waste flap is flushly arranged in the opening of the storage shelf. Hence, the user may simply press the waste flap down to release the opening of the rubbish bin located underneath the waste flap in order to insert rubbish.

In one example, the waste flap and rubbish bin are located in an edge region between the first functional wall and one of the at least one second functional wall. As the edge region is adjacent to the toilet unit it may enclose a rather large rubbish bin. This part inside the toilet module mainly remains unused by the user himself and does not limit the feeling of space for a user who sits on the toilet.

In one embodiment, a swivable table is attached to one of the first functional wall and the at least one second functional wall, wherein the swivable table is swivable into a stowage position and into a use position, wherein in the stowage position the swivable table rests flush on the respective functional wall and wherein in the use position the table rests on a support in a horizontal position. Such a swivable table inside the toilet module may exemplarily be used as a nursing table or for placing clothes on the swivable table when the user changes clothes inside the toilet module.

In one embodiment, the swivable table may be attached to the first functional wall and thereby has a use position directly above the toilet unit and a stowage position in which the swivable table constitutes a part of the first functional wall.

In one embodiment, the support for the swivable table may be a part of the storage shelf. For placing the swivable table in a use position, it may therefore just be swivelled down from the first or second functional wall and may rest on the storage shelf. A hinge line of a swivelling mechanism or a hinge of the swivable table may therefore be positioned corresponding to the height of the storage shelf such that the swivable table reaches a substantially horizontal position when it comes to rest on the storage shelf.

In case the swivable table extends over an edge region between the first functional wall and one of the at least one second functional wall where the rubbish bin is located, it may comprise a recess or cut-out corresponding to the waste flap for allowing the user to put rubbish into the rubbish bin even when the swivable table is placed in a use position.

In one embodiment, a working light is installed in the housing of the toilet module that allows lighting of the swivable table in a use position. For example, a light may be installed in the first or second functional wall in a region where the swivable table rests in a stowage position.

Furthermore, the respective first or second functional wall, at which the swivable table rests in a stowage position, can comprise a recess for receiving the swivable table. A working light may be installed in this recess. The swivable table can be coupled to a working light switch that switches on the working light as soon as the swivable table is brought into the use position.

Furthermore, the respective functional wall at which the swivable table rests in its stowage position, can comprise a working light that provides an indirect lighting when the swivable table is resting in the recess. The light rays from the working light may reach the inside of the toilet module housing through gaps between the respective functional wall and the swivable table.

In one embodiment, the access opening is closable by means of a bi-fold door. Thereby, the motion of the door does not require a lot of installation space and the user has an improved feeling of space on entering the toilet module and subsequently closing the bi-fold door.

In one embodiment, one of the at least one second functional wall comprises a stretcher flap that is swivably mounted on the respective second functional wall and may be swivelled into or out of the housing of the toilet module, wherein the stretcher flap reaches an edge between the respective second functional wall and the front wall. Thereby, a part of the respective second wall may be swivelled from a closed position, wherein the stretcher flap constitutes a part of the respective second functional wall, into an obstruction avoidance position, in which a stretcher moved inside the cabin of the aircraft is not obstructed by the toilet module. The handling of a stretcher is clearly improved as a clearly increased space is provided for moving the stretcher to or from the passenger seats.

In one example, the stretcher flap is arranged on or in the second functional wall that is directly adjacent to the wash basin and from which the toilet unit faces away, respectively. Thereby, the stretcher flap may extend from a top position of the second functional wall to a position above the wash basin.

In one embodiment, the above mentioned bi-fold door is arranged on the front wall of the toilet module, wherein a slidable end of the bi-fold door is directed to the edge between the front wall and the respective second functional wall. By opening the bi-fold door the slidable end may be slid away from the respective edge such that the access opening is opened. By also swivelling the stretcher flap into an obstruction avoidance position a whole section of the toilet module housing is removed such that a stretcher may easily be moved around or along the toilet module. The stretcher flap may thereby extend over a substantial part of the height of the toilet module and in one example, from a region above the washstand or storage shelf up to the upper side of the housing and generally up to the upper edge of the door in the access opening.

In one embodiment, an outward protrusion is arranged on the second functional wall, from which the toilet unit faces away. If the relevant second functional wall comprises a washstand, the protrusion may be arranged in a region which is positioned between the washstand and the toilet unit. The protrusion is located at least at a height above the toilet unit, and extends substantially as far as an upper face of the toilet module. However, it may also extend into a lower region. This provides space for the shoulders of the user, without the basic dimensions of the toilet module having to be changed.

In one embodiment, one of the at least one second functional wall is substantially flat and another second functional wall comprises an afore-mentioned protrusion on an underside of the toilet module, wherein a storage compartment extends from the protrusion up to the top of the toilet module on an outer side of the toilet module. Thereby, this toilet module may be combined with another toilet module that comprises a flat second functional wall positionable adjacent to the combination of the storage compartment and the protrusion, wherein the storage compartment is usable from an outside of the toilet modules.

In one embodiment, a vehicle attendant seat is arranged on the second functional wall, from which the toilet unit faces away. The vehicle attendant seat may generally be accommodated in a region which is orientated towards the front wall. The vehicle attendant seat is in one example, a folding seat, which is only folded out when required, for example during take-off and landing in the case of an aircraft. This leaves space for the toilet module for the protrusion of the second functional wall from which the toilet unit faces away. The protrusion may generally be formed in such a way that it corresponds to the external dimensions, that is to say in particular the depth, of the vehicle attendant seat when said seat is folded up. The vehicle attendant seat is in one example, arranged on a second functional wall which does not have an indentation.

The various teachings of the present disclosure further relate to a vehicle comprising a vehicle cabin and a toilet module as disclosed above. In one embodiment, the vehicle may be an aircraft, in particular, a commercial aircraft. The vehicle cabin may further be a passenger cabin.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 9A and 9B show three-dimensional views of a toilet module with a stretcher flap and a bi-fold door, while

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
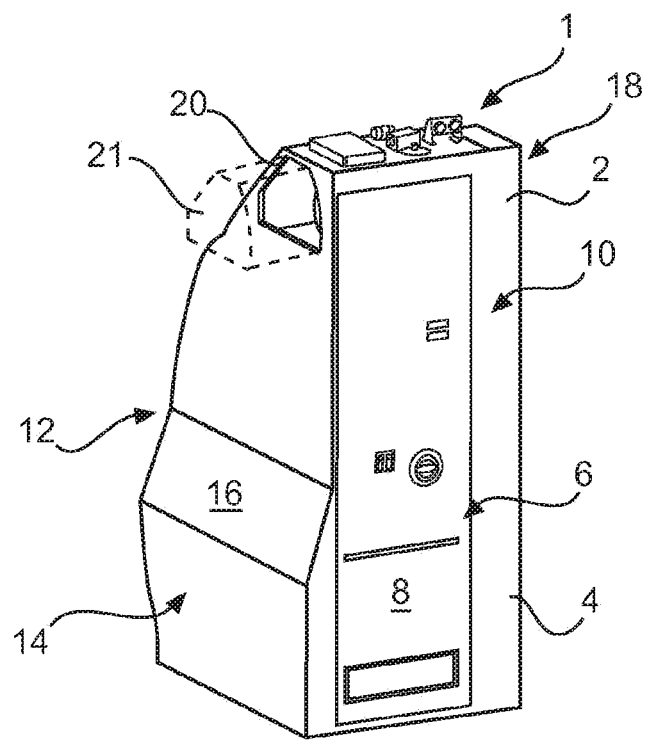
FIGS. 1A and 1B are three-dimensional views of a toilet module with and without lateral stowage compartment.

FIG. 1A is a three-dimensional view of the toilet module 1 according to the various teachings of the present disclosure from the outside. The toilet module 1 comprises a housing 2 having a front wall 4, which has an access opening 6 which is sealed by a door 8. The access opening 6 only takes up part of the width of the front wall 4, and is not arranged symmetrically on the front wall 4, but offset somewhat to the left. This results in a corner region 10, which is made use of on the inside of the toilet module 1.

A second functional wall 12 is attached to the front wall 4 on the left-hand side, and has on the underside thereof a protrusion 14, which enlarges the useable space in the interior of the toilet module 1, yet as a result of a required slant 16 makes it possible in particular for backrests of passenger seats which are arranged directly adjacent to the toilet module 1 to pivot inwards on the outside of the toilet module 1.

On an upper face 18 of the toilet module 1, the second functional wall 12 comprises an opening 20 which is accessible from the inside. Conventionally, if the toilet module 1 is arranged alongside an aisle in a vehicle cabin, there will be overhead storage compartments to the left and right of the toilet module 1, which in turn are in one example, fixed to fuselage formers. The fuselage formers are at a particular predetermined distance from one another, and thus limit the installation positions of overhead storage compartments. The distance from the second functional wall 12 to the last fuselage former which can be used for fixing an overhead storage compartment can be filled with an additional storage compartment 21 which extends outwards from the opening 20 of the second functional wall 12 and is shown in dashed lines in FIG. 1. In this way, consumable items, such as hand towels and the like, can be stored without wasting valuable space inside the toilet module 1.

Figure 1B:
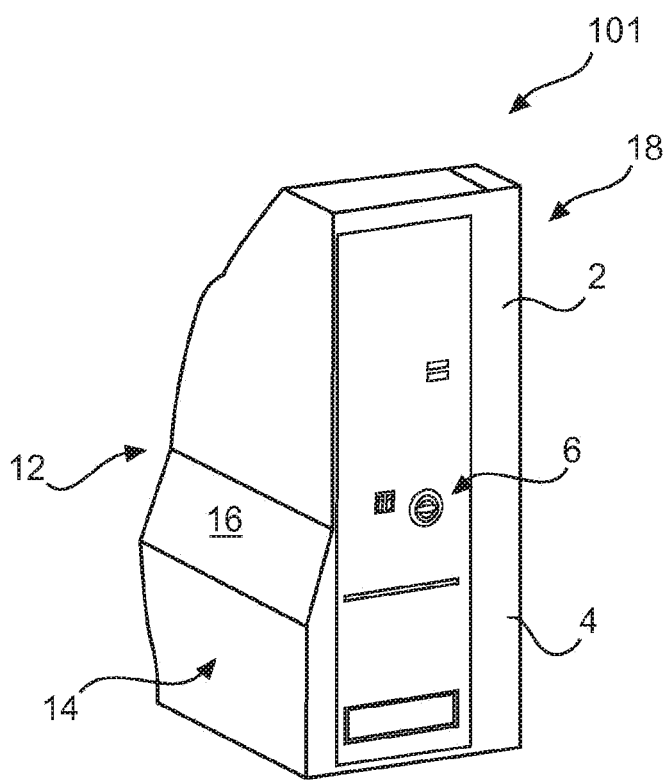

FIG. 1B shows a very similar toilet module 101 basically having the same components as the toilet module 1 of FIG. 1A, but without an opening 20 for accessing a storage compartment 21.

Figure 2:
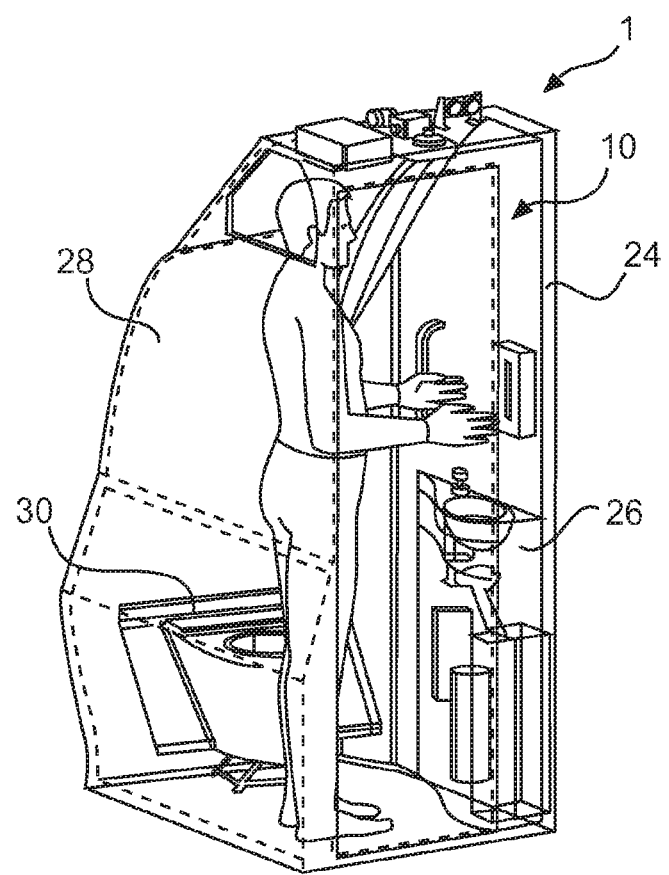
FIG. 2 shows a transparent toilet module, from the same direction as in FIG. 1.

FIG. 2 is a transparent drawing of the arrangement of installations inside the toilet module 1. In this context, a further second functional wall 24 can be seen and supports a washstand 26 which extends from this second functional wall 24 in the region 10 of the front wall 4. The washstand 26 is accordingly located as far as possible into the corner between the front wall 4 and the second functional wall 24, which are perpendicular to one another.

A toilet unit 30 is arranged on a first functional wall 28 opposite the front wall 4, and projects from the first functional wall 28 into the inside of the toilet module 1. The toilet unit 30 is arranged as far away from the washstand 26 as possible. The toilet unit 30 is located approximately centrally on the first functional wall 28 and is pivoted somewhat to the left. A longitudinal extension axis of the toilet unit, which is made clear in the following drawing, accordingly forms a non-zero angle with the second functional wall 24, which supports the washstand 26.

Figure 3:
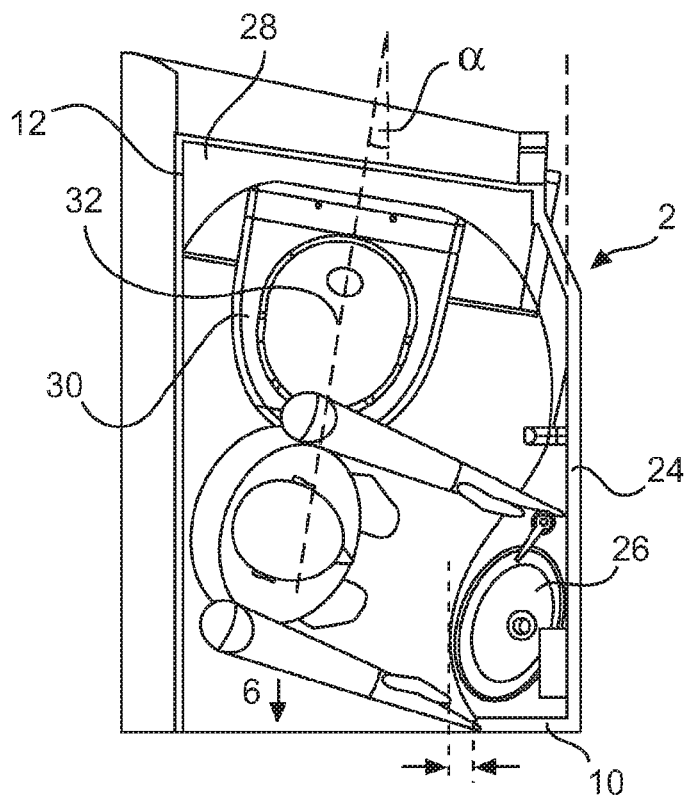
FIG. 3 is a plan view of a toilet module.

FIG. 3 is a plan view of the toilet module 1, showing the construction somewhat more clearly. The toilet unit 30 has a longitudinal extension axis 32 which extends oblique to the second functional wall 24 and the second functional wall 12. The angle α between the longitudinal extension axis 32 and the second functional wall 24 is in one example, in a range of from about 15° to about 45°. For clarity, the angle α in FIG. 3 is drawn with a parallel to the second functional wall 24. The toilet unit 30 accordingly faces away from the second functional wall 24 and towards the first functional wall 12.

Further, the washstand 26 extends entirely over the corner region 10 of the front wall 4, and further projects somewhat in front of the access opening 6. To avoid collisions and for a visually pleasing form, the washstand 26 is curved in a drop shape, that is to say the washbasin is formed in a board which curves in a drop shape. The intermediate space between the washstand 26 and the toilet unit 30 can therefore be of a virtually constant width, in such a way that a particularly comfortable sense of space is achieved.

By way of example, the first functional wall 28 is not orientated parallel to the front wall 4, but extends at a particular angle thereto. The toilet module 1 tapers or widens over the width thereof, in such a way that the toilet module 1 can be arranged in the region of a tail cone of an aircraft.

Figure 4:
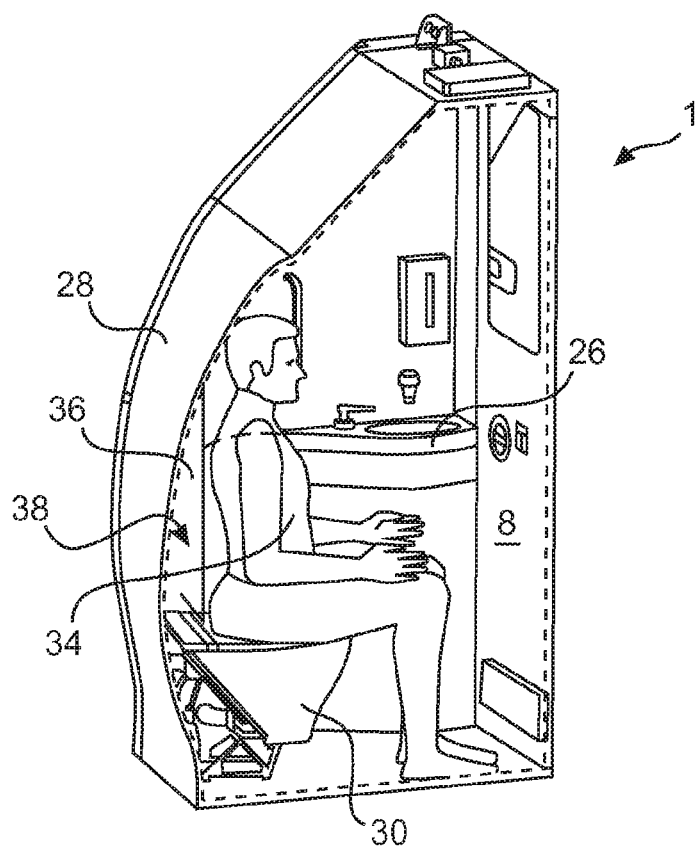
FIG. 4 is a lateral section through a toilet module.

FIG. 4 shows a person 34 who is using the toilet unit 30 and who gains a very comfortable sense of space despite the reduced width of the toilet module 1. The person's knees and feet can extend into a region in the protrusion 14, in such a way that the overall width of the toilet module can be reduced, so long as it is possible to sit on the toilet unit 30 unimpeded. As a result of the configuration according to the present disclosure of the toilet module 1, a width of about 10 inches of the toilet module 1 can be saved, and this often makes it possible to accommodate a further row of passenger seats in the vehicle, for example an aircraft. The distance between rows of passenger seats is conventionally 28-32 inches.

In a region above the toilet unit, a vertical boundary wall 36 can extend as far as the first functional wall 28, where it encloses a storage space 38. The boundary wall 36 can serve as a backrest for the person 34. This configuration is to be recommended in particular when the first functional wall 28 is curved, since the person 34 cannot readily lean against a curved first functional wall 28. To enlarge the storage space 38, the toilet unit 30 may optionally be offset further into the inside of the toilet module 1.

Figure 5:
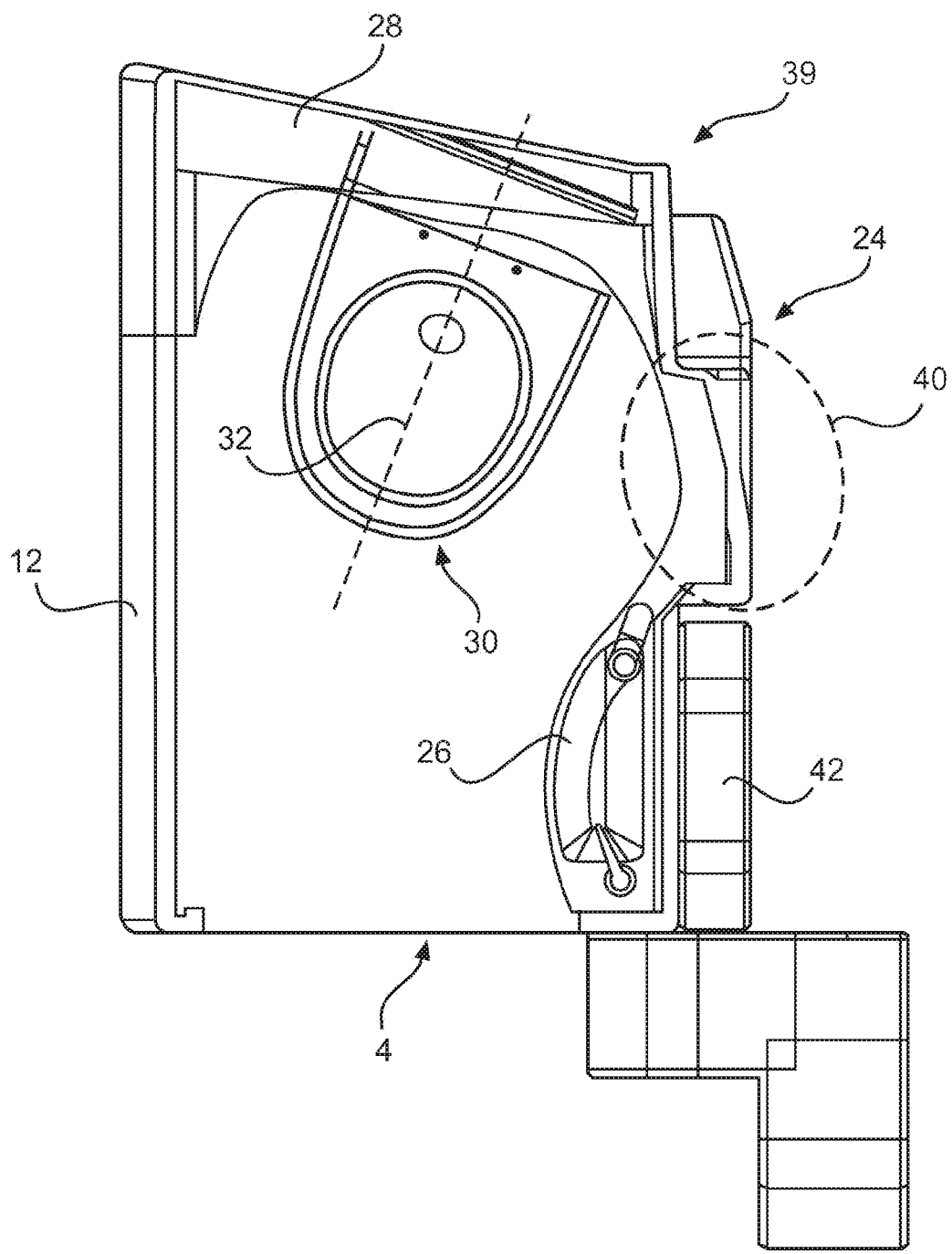
FIG. 5 is a plan view of a modified toilet module.

FIG. 5 is a plan view showing that a toilet module 39 may additionally comprise a protrusion 40 on the second functional wall 24 from which the toilet unit 30 faces away. This gives a person in the inside of the toilet module 39 sufficient freedom of movement, in particular when the protrusion is arranged at a height which is above the toilet unit 30. At the same time, a vehicle attendant seat 42 can be arranged alongside the protrusion 40, in a region orientated towards the front wall 4, and is in the form of a folding seat, in one example. The vertical extents of the protrusion 40 and the vehicle attendant seat 42 correspond in such a way that the vehicle attendant is also not squashed when sitting down.

Figure 6:
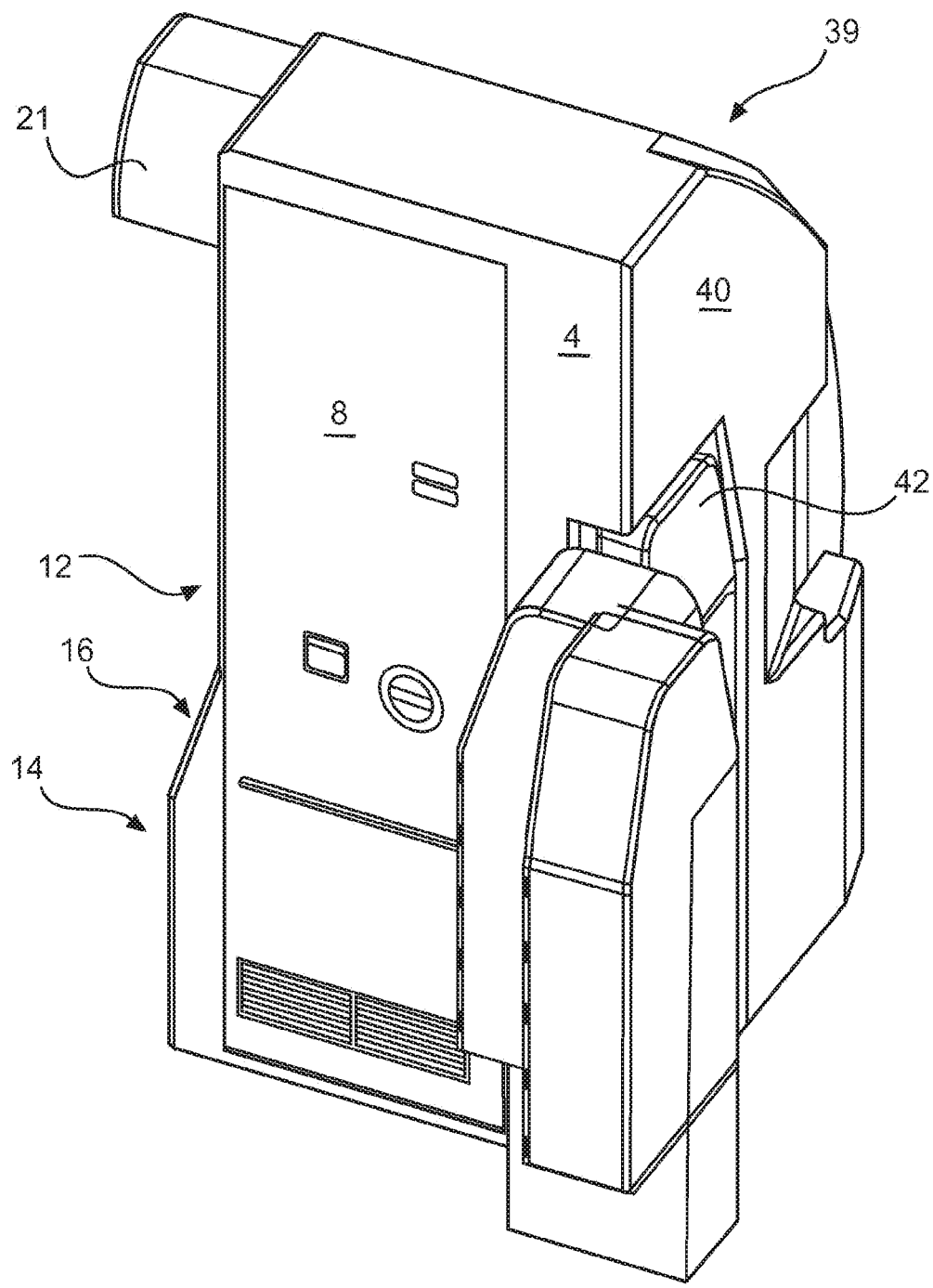
FIG. 6 is a three-dimensional view of the toilet module from FIG. 5.

FIG. 6 is a three-dimensional view of the toilet module 39, in which the protrusion 40 and the vehicle attendant seat 42 encompassed thereby are clearly visible. In addition, the toilet module 39 comprises a lateral storage compartment 21, as well as a protrusion 14 on the second functional wall 12 towards which the toilet unit 30 faces.

Figure 7:
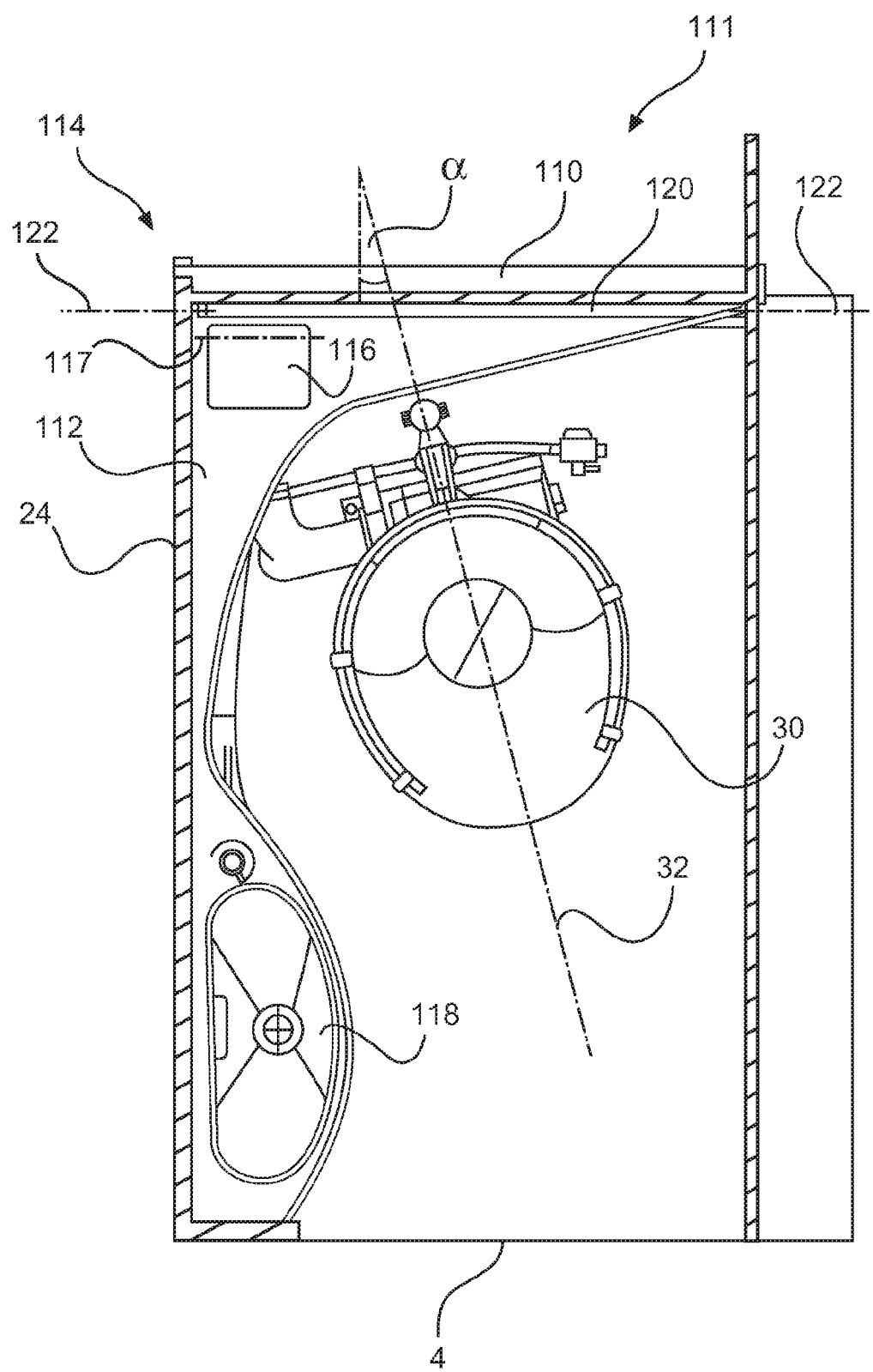
FIG. 7 shows a plan view of a toilet module.

In FIG. 7 an arrangement similar to FIG. 3 as a mirror-inverted toilet module 111 is shown. The toilet unit 30 has a longitudinal axis 32 that extends oblique to the first functional wall 110, which is arranged parallelly to the front wall 4. Extending from the first functional wall 110 to the left second functional wall 24, from which the toilet unit 30 faces away, a storage shelf 112 is installed. In an edge region 114 between the first functional wall 110 and the second functional wall 24, a waste flap 116 is arranged, under which a rubbish bin is situated (not depicted in detail). By pressing the waste flap 116 downwardly, it may swivel around a hinge axis 117 into an open position and rubbish may be put into the rubbish bin. By means of a spring mechanism (not depicted in detail), the waste flap 116 returns into a neutral position, in which the waste flap 116 creates a smooth and even surface with the adjacent parts of the storage shelf 112. As the user does not necessarily need the space behind or directly adjacent to the toilet unit 30, the rubbish bin may be realized with fairly large dimensions without obstructing the user and without requiring a large installation space.

Directly behind the toilet unit 30 a swivable table 120 in a stowage position is shown. The swivable table may be swivelled around a hinge line 122 in order to move it into a use position. In the depicted stowage position the swivable table 120 constitutes a part of the first functional wall 110 visible from the inside of the toilet module.

Figure 8A:
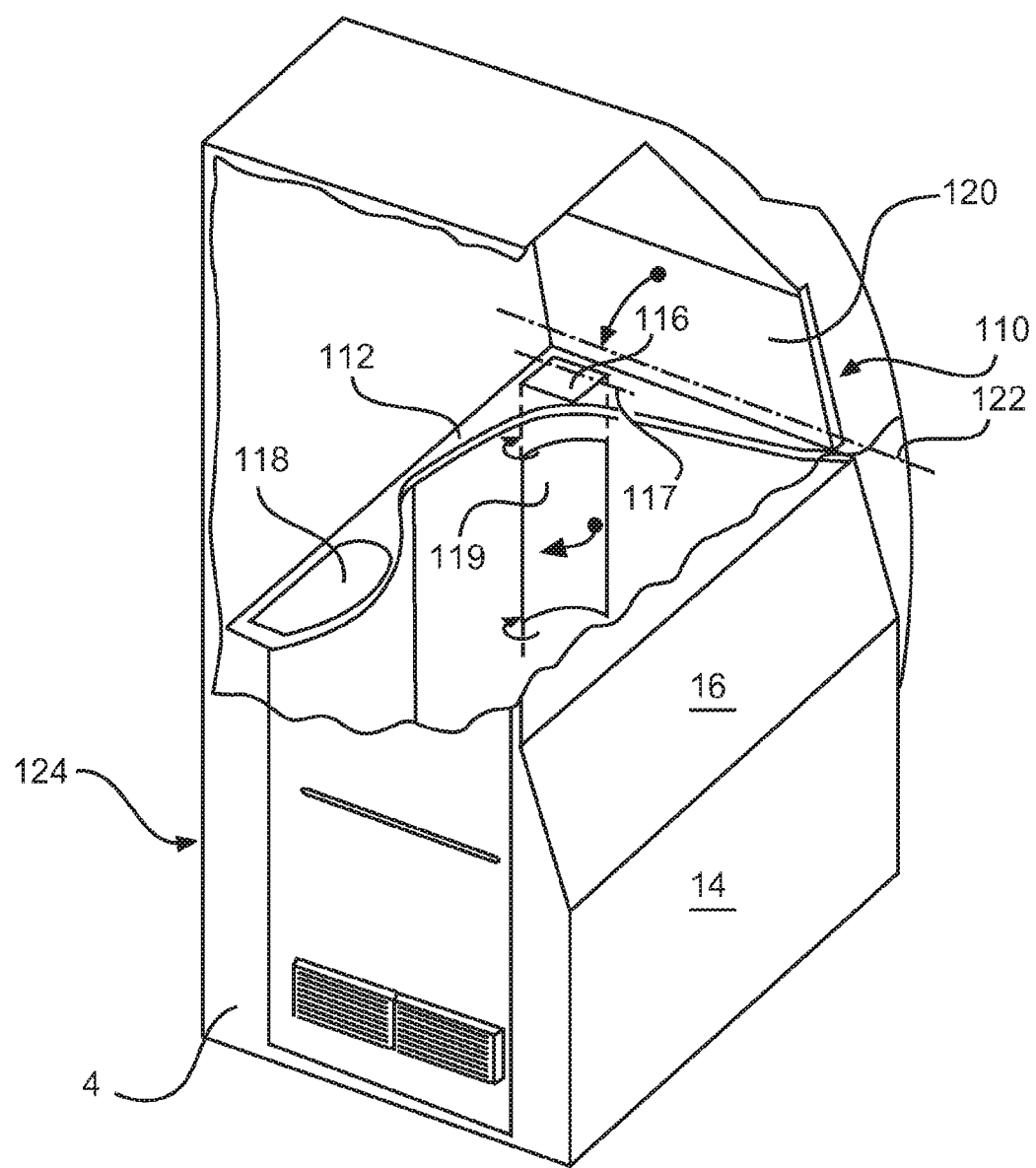
FIG. 8A-8D show three-dimensional views of a toilet module with a swivable table.

FIG. 8A shows the toilet module 111 from FIG. 7 in a three-dimensional partial section where the swivable table is shown in more detail. The swivable table 120 is supported in a swivable manner on the first functional wall 110 and hence comprises a substantially horizontal hinge axis 122 around which the swivable table 120 may be swivelled. Therefore, it may be brought into a position directly adjacent or flushly on the first functional wall 110 (stowage position) and in a position resting on the storage shelf 112 as a support (use position).

Underneath the waste flap 116 a rubbish bin is positioned. It may be emptied by a swivable cover 119 smoothly integrated into the outer surface of a lining or a stowage compartment underneath the storage shelf 112.

Figure 8B:
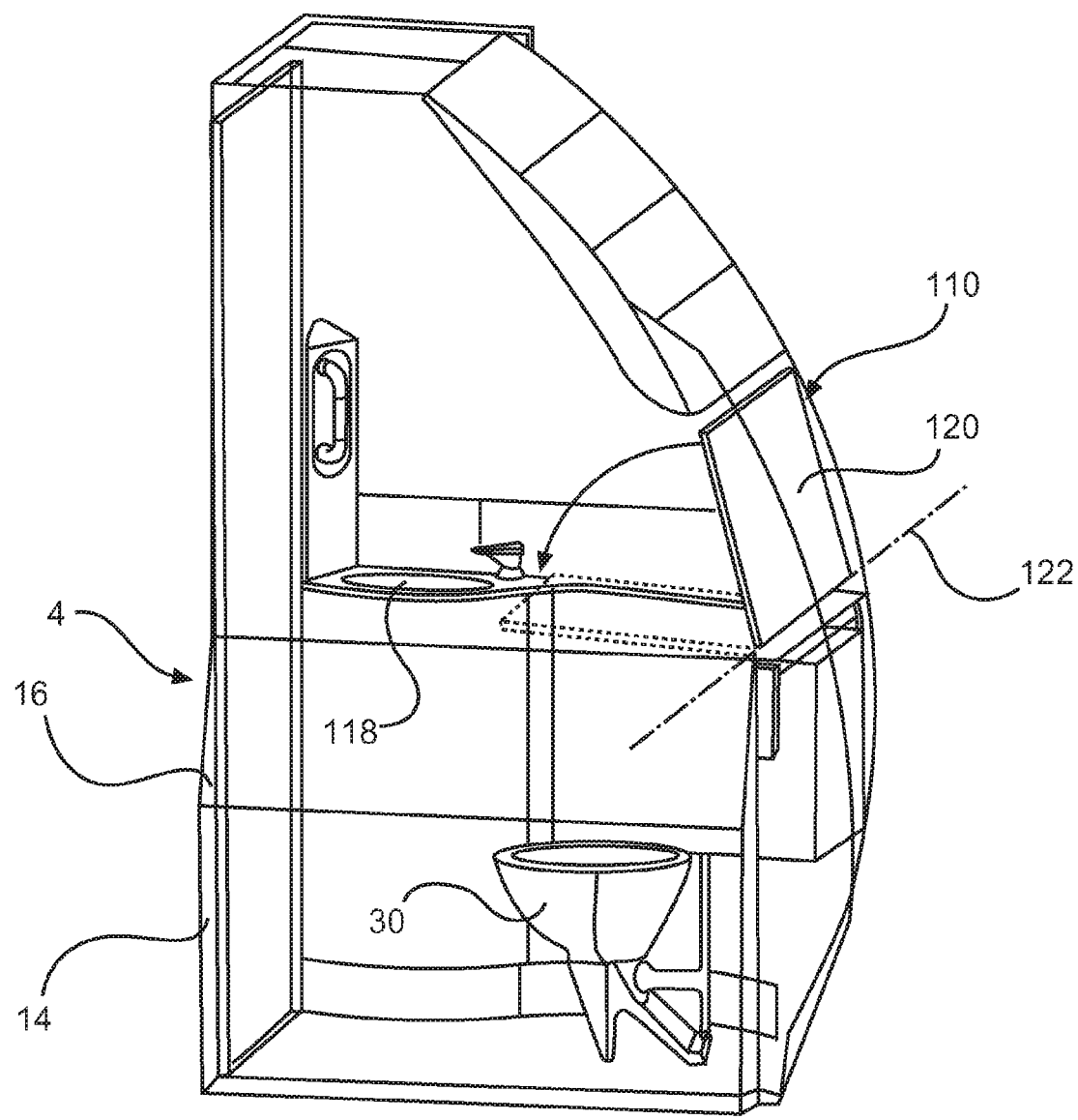

Another three-dimensional partial sectional view presented in FIG. 8B shows the arrangement of the swivable table 120 from another direction. It is clear that the swivable table 120 may constitute a part of a visible part of the first functional wall 110.

Figure 8C:
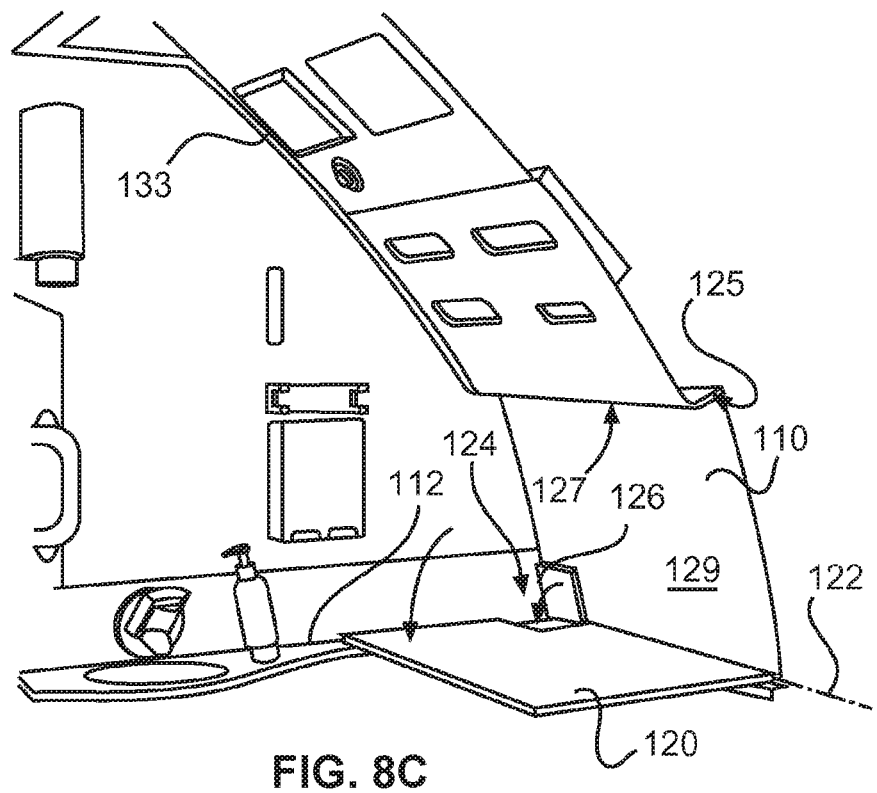

FIG. 8C shows the swivable table 120 in a use position, in which the swivable table 120 is arranged horizontally. The swivable table 120 comprises a cut-out 124 for maintaining an accessibility of the waste flap 116. At an edge 125 of a receiving indentation 129, wherein the edge 125 faces away from the hinge line 122, a working light 127 is arranged. By swivelling down the swivable table 120 the working light 127 may be switched on automatically or may be coupled to a manual switch, or an actuator coupled to a control line, a bus or a network in the aircraft adapted for receiving a switch command.

Figure 8D:
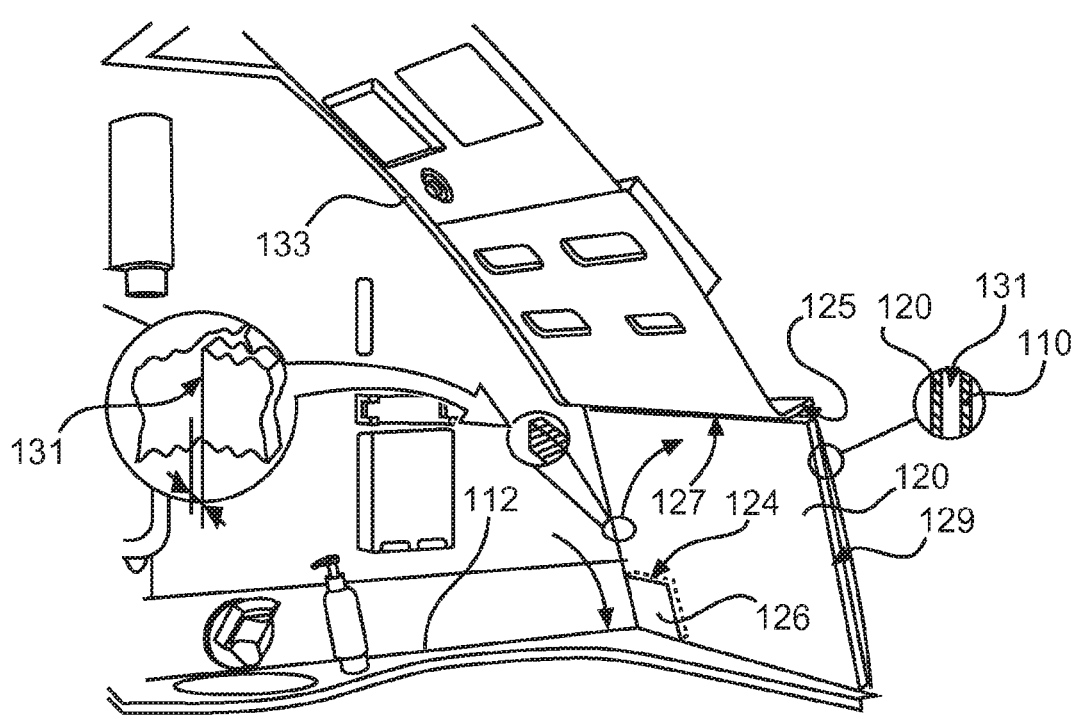

FIG. 8D shows the swivable table 120 in a stowage position resting completely in the receiving indentation 129. There it may be arrested by arresting means (not shown in detail), which may comprise a ratchet mechanism, a lock, a magnetic element or any other suitable means for holding the swivable table in the stowage position.

Furthermore, a part of the first functional wall 110 comprises a filler element 126 fixed to or swivably mounted on the first functional wall 110. The filler element 126 can have two functions. It may be used for filling fills the cut-out 124 of the swivable table 120 in order to provide a smoothly as possible surface in the stowage position. The swivable table 120 and the filler element 126 thereby constitute an almost completely continuous element.

Also, by swivably supporting the filler element 126, e.g. around the hinge axis 122, it may also be used for filling the cut-out 124 in the swivable table 120 in a use position. Designing the filler element 126 as such a flap clearly reduces a potential danger for pinching or trapping a hand, fingers, an arm, etc. of a child, who rests on the swivable table when it is used as a nursing table, in the spring loaded waste flap. The filler element 126 may be designed corresponding to the waste flap 116 and should have the same thickness as the swivable table 120. The cut-out 124 may be designed such that the filler element 126 follows a swivelling motion of the table 120 into the stowage position by providing a step on an inner side of the cut-out that reduces the clearance of the cut-out 124 in a position facing away from the surface that is useable, i.e. the upper side of the swivelling table when in the use position. The filler element 126 may therefore be designed as a safety device. For use of the waste flap the filler element 126 may be opened first to allow waste to be disposed.

By arranging gaps 131 between the swivable table 120 and the receiving indentation 129 or the first functional wall 110 the working light 127 can provide an indirect lighting, wherein light rays from the working light 127 reach through the gaps 131 to the inside of the housing of the toilet module.

Further, it may provide a pleasant atmosphere by installing ambient or accent lights 133 in edge regions between the functional walls, as exemplarily shown in FIGS. 8C and 8D. Of course, these lights may be installed in every other exemplary embodiment shown.

Figure 9A:
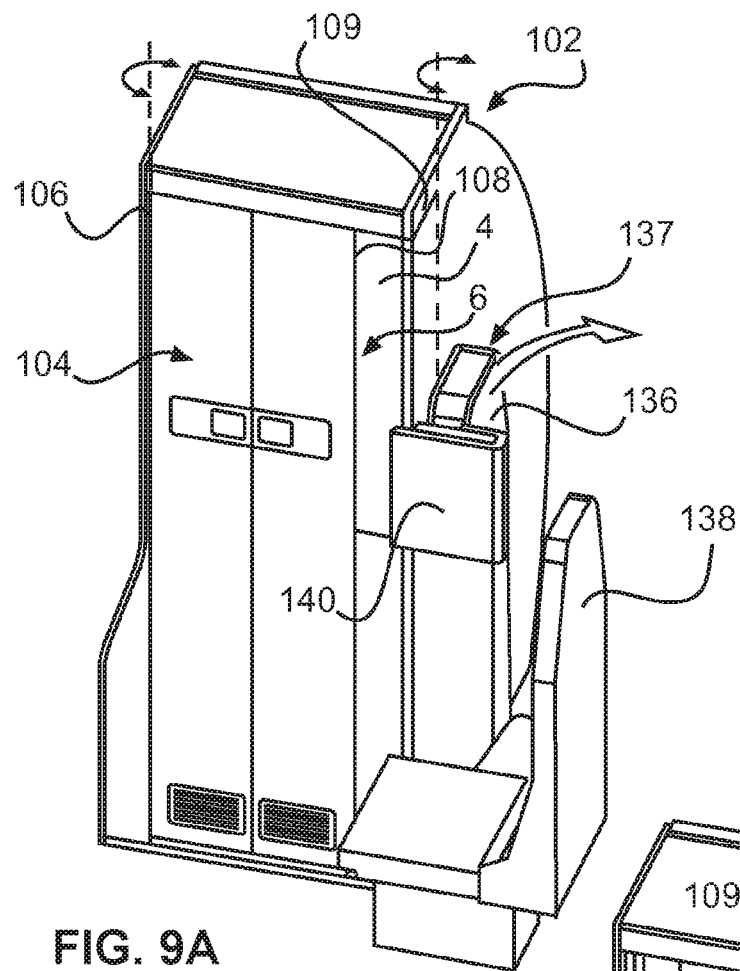

FIG. 9A shows a toilet module 102 with an access opening 6 that is closed by a bi-fold door 104 with a first edge 106 that is swivably supported in the front wall 4 and with a second edge 108 that is slidably supported in the front wall 4 such that it may slide towards the first edge 106. Thereby, the access opening 106 may be opened under consumption of very little installation space.

Figure 9B:
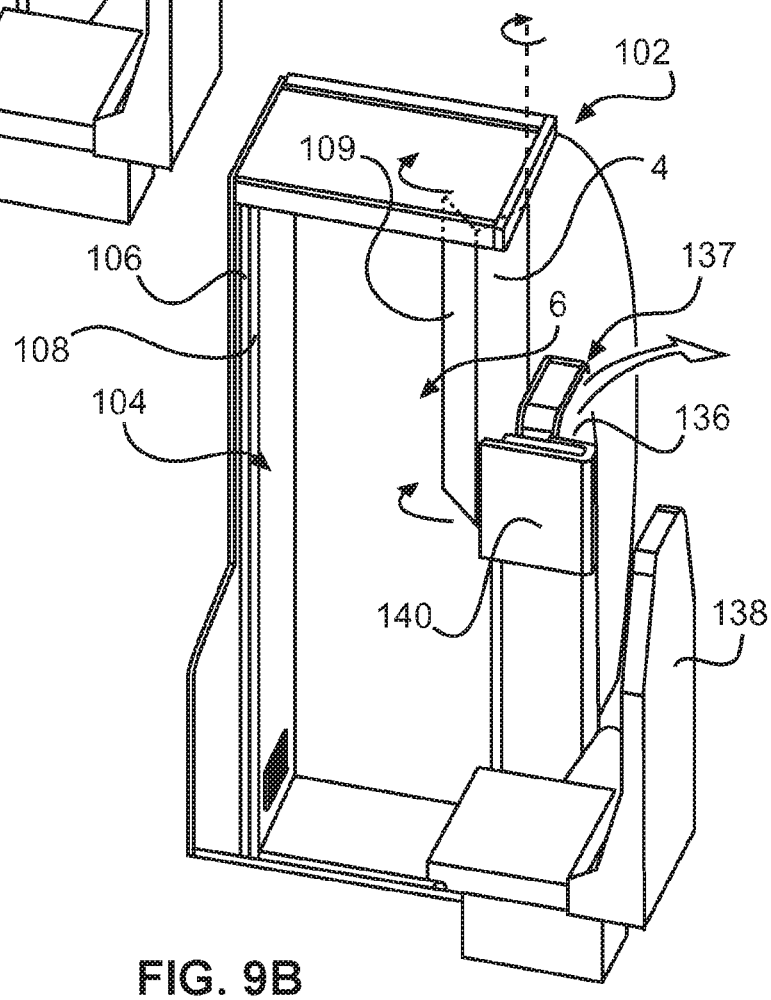

In FIG. 9B the bi-fold door 104 is opened. Thereby the second edge 108 is now located adjacent to the first edge 106 and the door 104 is folded. This allows a stretcher flap 109 to be swivelled at least partially or completely into the inside of the toilet module 102. Thereby, a large section of an upper section of the housing of the toilet module 102 is removed and a stretcher may easily be maneuvered in the vicinity of it.

Exemplarily, the toilet module 102 comprises an arrangement of cabin attendant seats 136 and 138 that are positioned in opposite longitudinal directions and attached to the toilet module 102 or somehow combined with it and arranged directly adjacent to each other. Exemplarily, the cabin attendant seat 136 may be wall mounted, while the cabin attendant seat 138 may be floor mounted adjacent to the toilet module 102. Further, a padding element 140 is installed at the wall mounted cabin attendant seat 136 in a region near a detachable head rest 137 for the protection of the cabin attendants. The padding element 140 separates the head strike path of an attendant seated on the floor mounted cabin attendant seat 138 from the attendant seated on the wall mounted cabin attendant seat 136. The head rest 137 is detachable in order to not obstruct a stretcher while the stretcher flap 109 is moved into the inside of the toilet module 102.

Figure 9C:
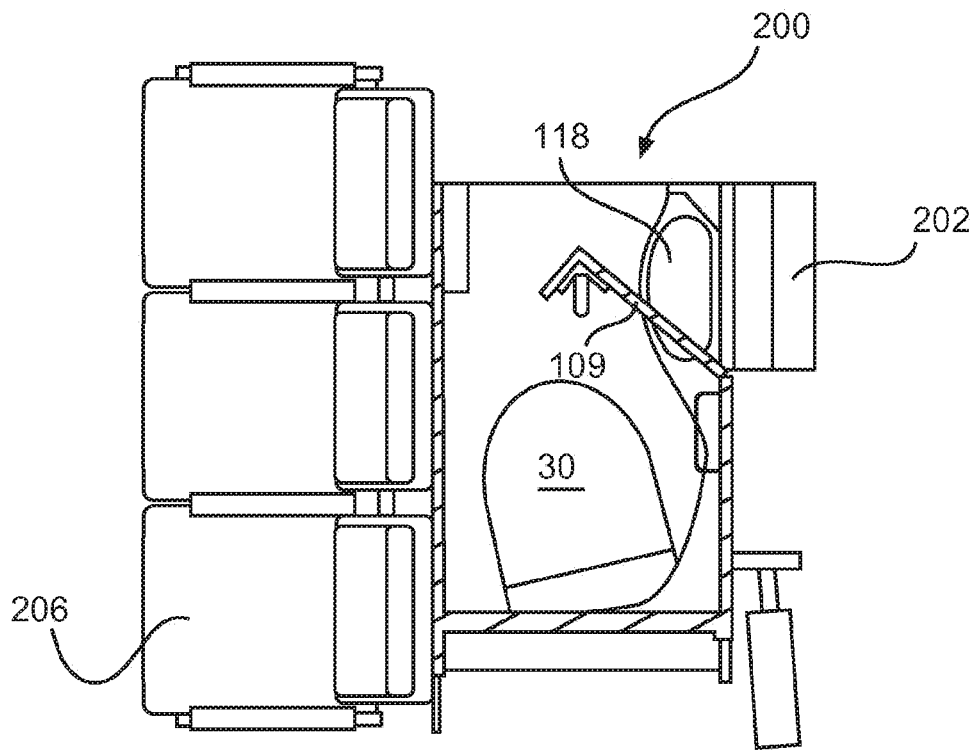
FIGS. 9C and 9D show the stretcher flap in use.
Figure 9D:
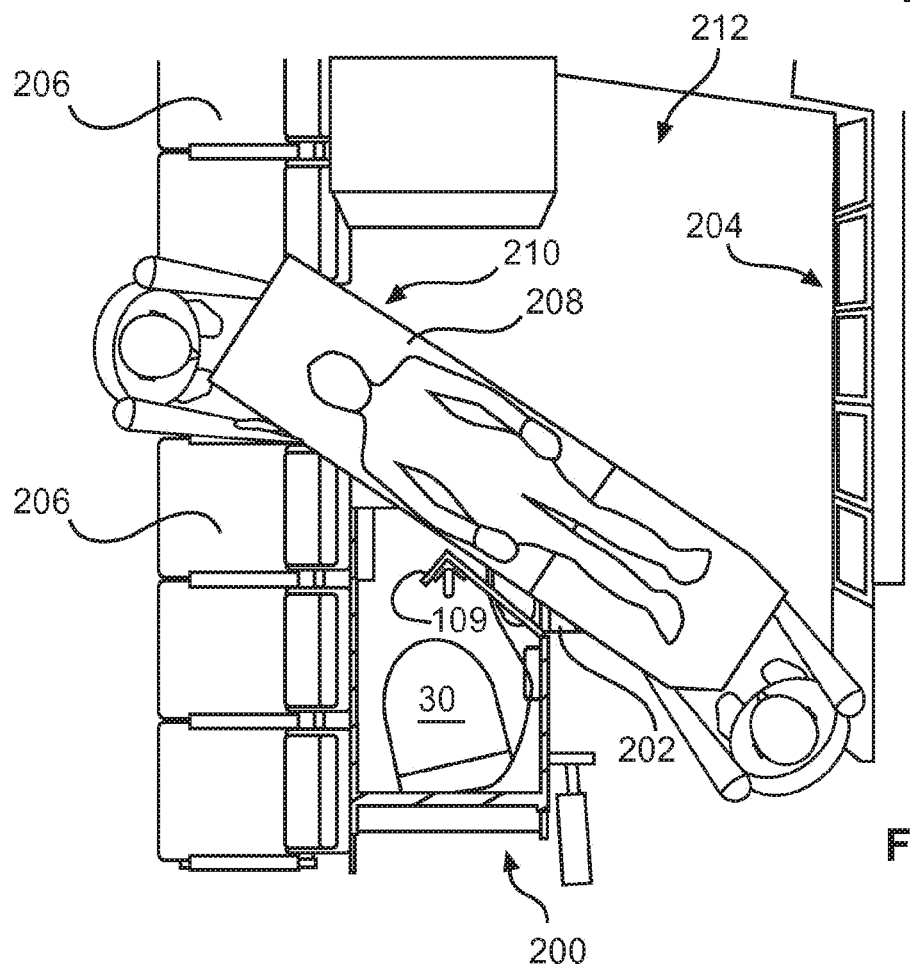

For the purpose of clarity, the practical use of the stretcher flap 109 is shown in two additional FIGS. 9C and 9D. The stretcher flap 109 of a toilet module 200 is moved inwardly such that a space above the wash basin 118 is non-obstructive. A head rest of a wall mounted cabin attendant seat 202 may have been detached such that the cabin attendant seat is neither obstructive. As depicted in FIG. 9D a stretcher 208 may be moved from an aisle 210 to a space 212 in which access doors (not depicted in detail) may be situated. Due to the limited maneuverability caused by the narrowness of the aisle 210 adjacent to passenger seats 206 as well as the narrowness of the space 212, e.g. due to the nearby galley 204, the stretcher flap 109 supports moving the stretcher 208 from an aisle to access doors in the space 212.

Figure 10A:
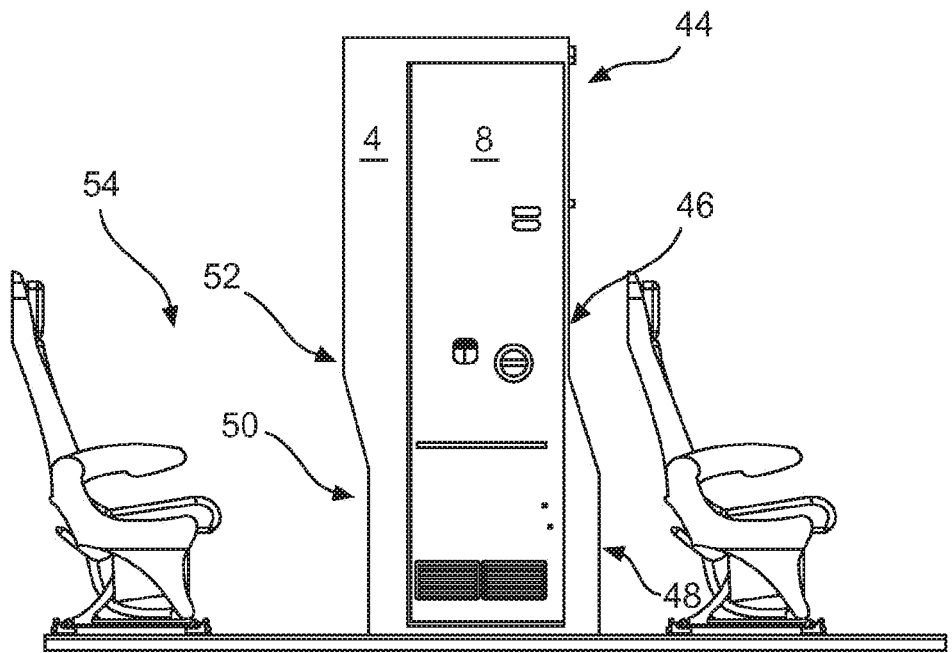
FIGS. 10A and 10B each show a toilet module having an indentation and/or a protrusion.

FIG. 10A shows a toilet module 44 which comprises a protrusion 48 on a second functional wall 46 towards which the toilet unit 30 faces. On an opposite second functional wall 52, there is an indentation 50, the shaping of which corresponds to the shape of the protrusion 48. In this way, a passenger seat 54 behind it can be provided with sufficient foot room.

Figure 10B:
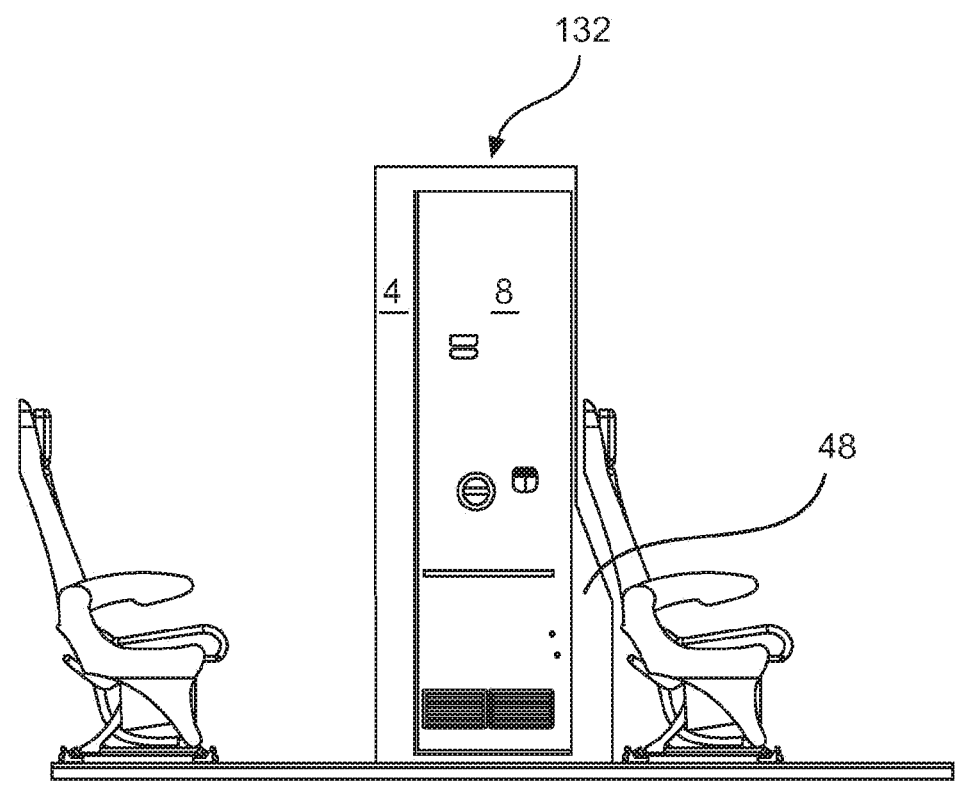
Figure 12:
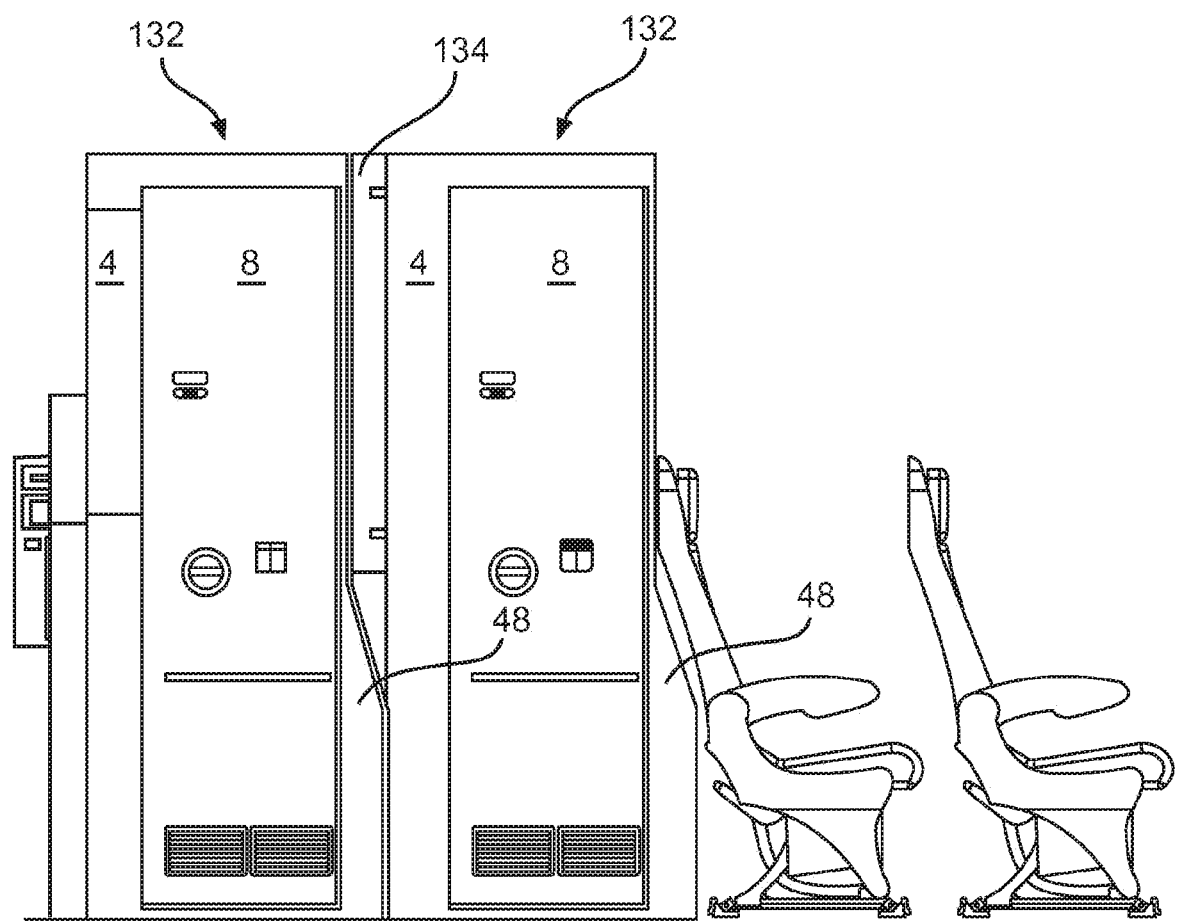
FIG. 12 shows two toilet modules arranged in a line with a stowage compartment arranged between the toiles modules.

FIG. 10B furthermore demonstrates a toilet module 132 that does not such an indentation and may easily be combined with a mirror-inverted toilet module 132 or the same toilet module 132 as shown in FIG. 12.

Figure 11:
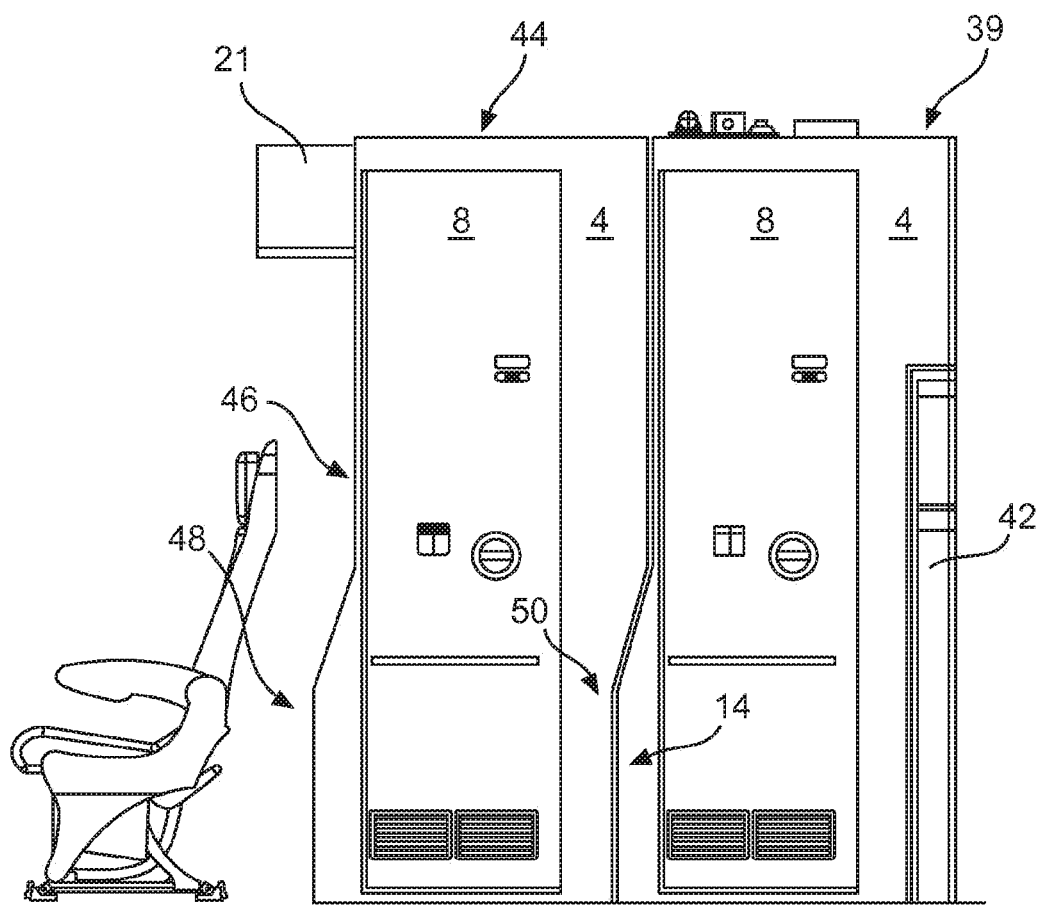
FIG. 11 shows two toilet modules arranged in a line.

FIG. 11 shows an arrangement, in a line, of a toilet module 44 from FIG. 7 in a mirrored form and of a toilet module 39 from FIG. 6, although the latter does not have an external storage compartment 21. The second functional wall 46 of the left-hand toilet module 44 is positioned tight against the second functional wall 12 of the right-hand toilet module 39, resulting in a unit consisting of two toilet modules.

Finally, FIG. 12 shows an arrangement of two toilet modules 132 with a stowage compartment 134 arranged above the protrusion of the left toilet module and constituting a flat surface arranged flush on the left side of the right toilet module 132.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A toilet module for a vehicle, the toilet module comprising:
   a toilet unit;
   a housing including:
      a front wall with an access opening;
      a first functional wall arranged opposite the front wall and supporting the toilet unit; and
      a second functional wall perpendicular to the front wall and extending between the front wall and the first functional wall;
   a storage shelf attached to the housing and having an upper surface;
   a wash basin formed in the upper surface of the storage shelf; and
   a swivable table attached to the housing at an attachment location on the first functional wall and movable to an extended configuration, wherein the swivable table overlaps the upper surface of the storage shelf when in the extended configuration,
   wherein the swivable table is laterally distanced from the wash basin when in the extended configuration such that the swivable table does not overlap the wash basin when in the extended configuration,
   wherein the storage shelf is located directly between the attachment location and the toilet unit, and
   wherein the housing includes a third functional wall distanced from the second functional wall,
   wherein the storage shelf has a back shelf edge attached to the first functional wall and has a front shelf edge,
   wherein the storage shelf has a depth from the back shelf edge to the front shelf edge, and wherein the storage shelf is tapered such that the depth of the storage shelf adjacent the second functional wall is greater than the depth of the storage shelf adjacent the third functional wall.

2. The toilet module of claim 1 wherein the housing includes a third functional wall distanced from the second functional wall and extending between the front wall and the first functional wall, and wherein the storage shelf contacts the first functional wall along an interface extending from the second functional wall to the third functional wall.

3. A toilet module for a vehicle, the toilet module comprising:

a toilet unit;
a housing including:
   a front wall with an access opening;
   a first functional wall arranged opposite the front wall and supporting the toilet unit; and
   a second functional wall perpendicular to the front wall and extending between the front wall and the first functional wall;
a storage shelf attached to the housing and having an upper surface;
a wash basin formed in the upper surface of the storage shelf; and
   a swivable table attached to the housing at an attachment location on the first functional wall and movable to an extended configuration, wherein the swivable table overlaps the upper surface of the storage shelf when in the extended configuration,
   wherein the swivable table is laterally distanced from the wash basin when in the extended configuration such that the swivable table does not overlap the wash basin when in the extended configuration,
   wherein the storage shelf is located directly between the attachment location and the toilet unit, and
wherein the storage shelf extends from the first functional wall to the wash basin,
wherein the swivable table extends from a back table edge to a front table edge,
wherein the swivable table is directly contacted and supported by the storage shelf continuously from the back table edge to the front table edge when in the extended configuration, wherein the back table edge is attached to the first functional wall, and
wherein the front table edge is laterally distanced from the wash basin when in the extended configuration.

4. A toilet module for a vehicle, the toilet module comprising:
a toilet unit;
a housing including:
   a front wall with an access opening;
   a first functional wall arranged opposite the front wall and supporting the toilet unit; and
   a second functional wall perpendicular to the front wall and extending between the front wall and the first functional wall;
a storage shelf attached to the housing and having an upper surface;
a wash basin formed in the upper surface of the storage shelf; and
   a swivable table attached to the housing at an attachment location on the first functional wall and movable to an extended configuration, wherein the swivable table overlaps the upper surface of the storage shelf when in the extended configuration,
   wherein the swivable table is laterally distanced from the wash basin when in the extended configuration such that the swivable table does not overlap the wash basin when in the extended configuration,
   wherein the storage shelf is located directly between the attachment location and the toilet unit,
   wherein the storage shelf extends along the second functional wall from contact with the first functional wall to contact with the front wall,
   wherein the housing includes a third functional wall distanced from the second functional wall and extending between the front wall and the first functional wall, and
   wherein the storage shelf extends along the first functional wall from contact with the second functional wall to contact with the third functional wall.

5. The toilet module of claim 1 wherein the swivable table is attached to the first functional wall, wherein, in the extended configuration, the swivable table is supported only by the storage shelf and the attachment location on the first functional wall.

6. A toilet module for a vehicle, the toilet module comprising:
a toilet unit;
a housing including:
   a front wall with an access opening;
   a first functional wall arranged opposite the front wall and supporting the toilet unit; and
   a second functional wall perpendicular to the front wall and extending between the front wall and the first functional wall;
a storage shelf attached to the housing and having an upper surface;
a wash basin formed in the upper surface of the storage shelf; and
   a swivable table attached to the housing at an attachment location on the first functional wall and movable to an extended configuration, wherein the swivable table overlaps the upper surface of the storage shelf when in the extended configuration,
   wherein the swivable table is laterally distanced from the wash basin when in the extended configuration such that the swivable table does not overlap the wash basin when in the extended configuration,
   wherein the storage shelf is located directly between the attachment location and the toilet unit,
   wherein the swivable table is attached to the first functional wall,
   wherein the housing includes a third functional wall distanced from the second functional wall,
   wherein the first functional wall has a first width from the second functional wall to the third functional wall, and
   wherein the swivable table has a table width equal to the first width.

7. The toilet module of claim 1 wherein the swivable table is attached to the first functional wall, wherein the storage shelf is attached to the first functional wall, and wherein the swivable table rests upon the storage shelf at an interface between the storage shelf and the first functional wall.

8. The toilet module of claim 1 wherein the housing is formed over a floor surface, wherein the wash basin has an upper surface at a first height from the floor surface; wherein a lower surface of the swivable table is directly contacted and supported by the storage shelf continuously from a back table edge to a front table edge when in the extended configuration, wherein the lower surface of the swivable table is at a second height from the floor surface when in the extended configuration, and wherein the second height is not less the first height.

9. The toilet module of claim 1 wherein the toilet unit includes a toilet bowl having an ellipse shape, wherein the toilet unit has a longitudinal extension axis which serves as the major longitudinal axis of the ellipse shape and which forms an angle which is greater than 0° with the second functional wall, wherein the storage shelf has a back shelf edge attached to the first functional wall and has a front shelf edge distanced from the back shelf edge, and wherein longitudinal extension axis is perpendicular to the front shelf edge.

10. A vehicle, comprising:
a vehicle cabin; and
a toilet module including a housing and a toilet unit, wherein the toilet unit includes a toilet bowl having an ellipse shape, and wherein the toilet unit has a longitudinal extension axis which serves as the major longitudinal axis of the ellipse shape and wherein the housing includes:
a front wall with an access opening;
a first functional wall arranged opposite the front wall and supporting the toilet unit;
a second functional wall extending between the first functional wall and the front wall, wherein the second functional wall is perpendicular to the front wall; wherein the housing encloses a floor surface on the underside of the housing; and wherein the longitudinal extension axis forms an angle which is greater than 0° with the second functional wall;
a third functional wall extending between the first functional wall and the front wall;
a horizontally arranged storage shelf inside the toilet module attached to the first functional wall and attached to the second functional wall, wherein the storage shelf extends continuously along the first functional wall from the second functional wall to the third functional wall, wherein the storage shelf extends continuously along the second functional wall from the first functional wall to the front wall, wherein the storage shelf is formed with and completely surrounds an internal opening; and
a swivable table attached to the housing and movable to an extended configuration, wherein the swivable table overlaps the horizontally arranged storage shelf when in the extended configuration.

11. The vehicle of claim 10 wherein the storage shelf has a back shelf edge attached to the first functional wall and has a front shelf edge, wherein the storage shelf has a depth from the back shelf edge to the front shelf edge, and wherein the storage shelf is tapered such that the depth of the storage shelf adjacent the second functional wall is greater than the depth of the storage shelf adjacent the third functional wall.

12. The vehicle of claim 11 wherein the longitudinal extension axis is perpendicular to the front edge of the storage shelf.

13. The toilet module of claim 1 wherein the swivable table is only supported by the storage shelf when in the extended configuration.

14. The vehicle of claim 10 wherein the swivable table extends from a back table edge to a front table edge, wherein the back table edge is attached to the first functional wall, wherein the swivable table is directly contacted and supported by the storage shelf continuously from the back table edge to the front table edge when in the extended configuration, wherein a wash basin is formed in the storage shelf adjacent the second functional wall, and wherein the front table edge is laterally distanced from the wash basin when in the extended configuration such that no portion of the swivable table overlaps the wash basin in the extended configuration.

15. The vehicle of claim 10 wherein the swivable table is attached to the first functional wall, and wherein a portion of the swivable table rests upon the storage shelf at an interface between the storage shelf and the first functional wall.

16. The vehicle of claim 10 wherein the swivable table is attached to the first functional wall, wherein the first functional wall has a first width from the second functional wall to the third functional wall, and wherein the swivable table has a table width equal to the first width.

17. The vehicle of claim 10 wherein the swivable table is movable between a stowage configuration and the extended configuration, and wherein the swivable table is perpendicular to the second functional wall in the stowage configuration and in the extended configuration.

18. A toilet module for a vehicle, the toilet module comprising:
a toilet unit;
a housing formed over a floor surface and including:
a front wall with an access opening;
a first functional wall arranged opposite the front wall and supporting the toilet unit;
a second functional wall perpendicular to the front wall and extending between the front wall and the first functional wall; and
a third functional wall parallel to the second functional wall and perpendicular to the front wall and extending between the front wall and the first functional wall;
a washstand attached to the housing and including a wash basin, wherein the wash basin has an upper surface at a first height from the floor surface; and
a storage shelf extending from the first functional wall to the wash basin; and
a swivable table extending from a back table edge to a front table edge, wherein the swivable table is attached to the first functional wall and is movable to an extended configuration,
wherein a lower surface of the swivable table is directly contacted and supported by the storage shelf continuously from the back table edge to the front table edge when in the extended configuration, wherein the lower surface of the swivable table is at a second height from the floor surface when in the extended configuration, and wherein the second height is not less the first height.

19. The toilet module of claim 18 wherein the second functional wall is distanced from the third functional wall by a first width, and wherein the swivable table has a table width equal to the first width.

* * * * *